May 16, 1961 — R. C. SHAFER — 2,983,987
METHOD OF FORMING ARTICLES
Filed June 30, 1958 — 2 Sheets-Sheet 1
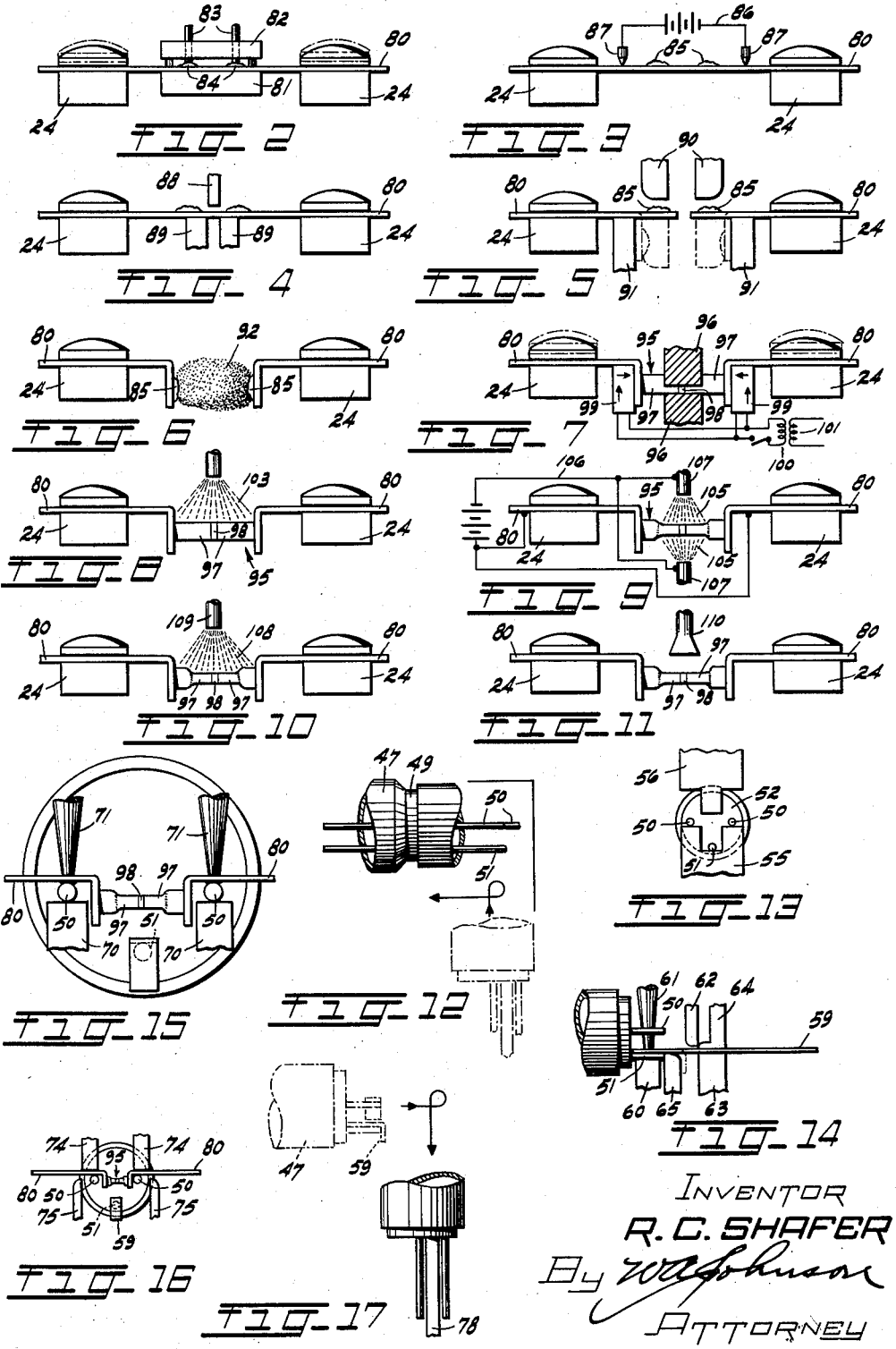
INVENTOR
R. C. SHAFER
By W. A. Johnson
ATTORNEY

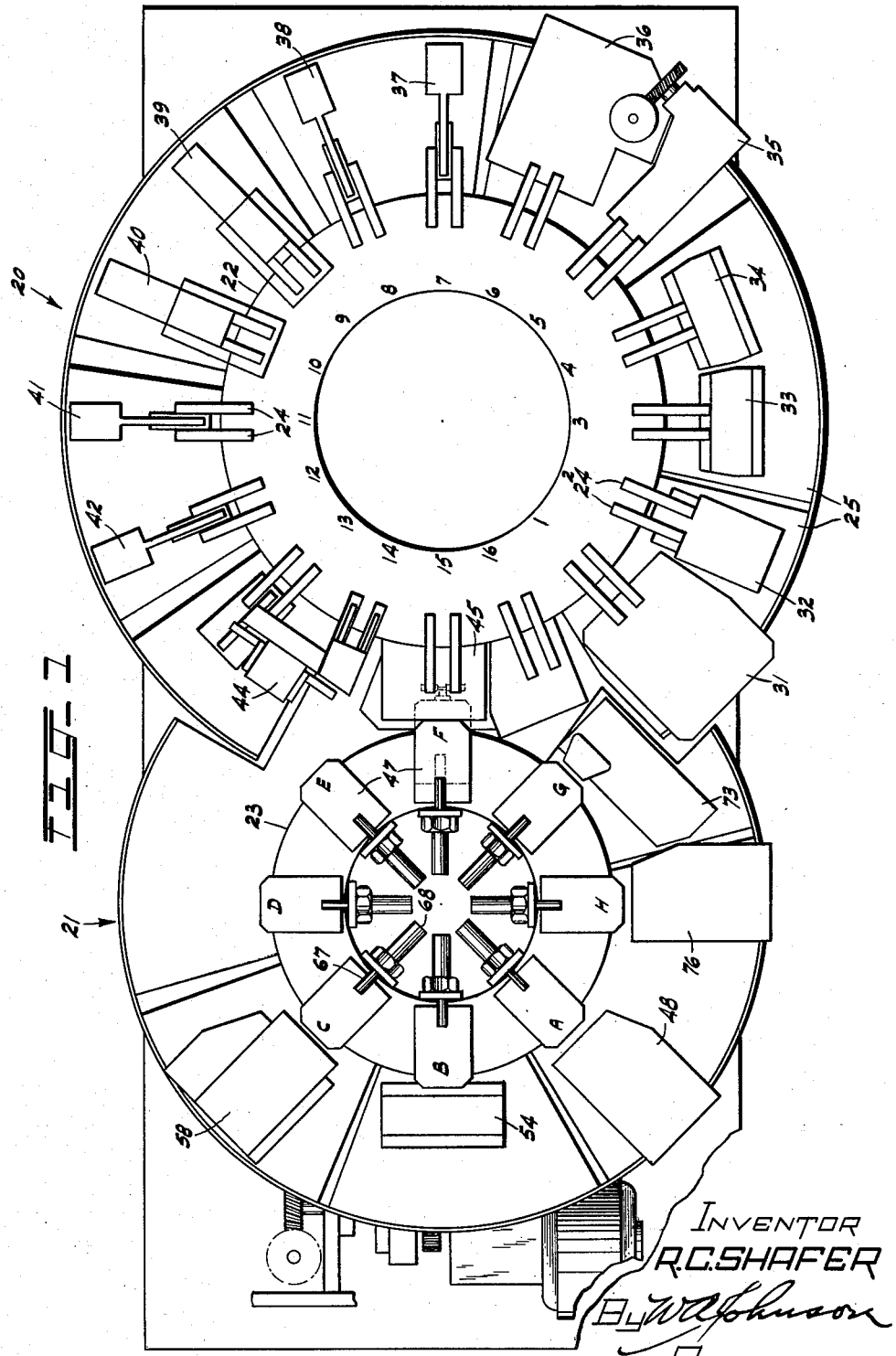

United States Patent Office 2,983,987
Patented May 16, 1961

2,983,987

METHOD OF FORMING ARTICLES

Richard C. Shafer, Emmaus, Pa., assignor to Western Electric Company, Incorporated, New York, N.Y., a corporation of New York Filed June 30, 1958, Ser. No. 745,388
2 Claims. (Cl. 29—25.3)

This invention relates to methods of fabricating articles particularly electrical articles such as transistors.

In the manufacture of certain types of articles a succession of method steps are usually followed. It has been found that, in some instances, the method steps may be grouped to form sub-assemblies of articles and that certain steps common to the groups of steps could join the subassemblies into an article.

An object of the present invention is the carrying out of groups of method steps simultaneously to form sub-assemblies of articles and a step common to both groups for joining the sub-assemblies into an article.

A further object of the invention is the inclusion, in the method, of steps of preparing parts for the formation of an article.

In compliance with certain of the objects, the invention comprises steps in a method of processing parts such as conductive members for receiving units, for example, crystal transistor bars. More specifically, the invention is embodied in a method of fabricating articles with the aid of first and second holders comprising forming sub-assemblies of articles in the first holders, forming other sub-assemblies for the articles in the second holders, causing relative movement for companion first and second holders to move the sub-assemblies thereof in assembly, and securing the sub-assemblies together in their assembled positions.

Other objects and advantages will be apparent from the following detailed description when considered in conjunction with the accompanying drawings, wherein:

Fig. 1 is a schematic top plan view of the apparatus by the aid of which the method may be practiced;

Fig. 2 is a schematic illustration of the feeding of a conductive element or a metallic ribbon to holders and the application of spaced deposits of flux thereon;

Fig. 3 is a schematic illustration of the depositing of quantities of solder on the flux deposits on the ribbon;

Fig. 4 is a schematic illustration of the cutting of the central portion from the ribbon between the solder and flux deposits;

Fig. 5 is a schematic illustration of the bending of the inner end portions of the ribbon members to position them parallel with each other;

Fig. 6 is a schematic illustration of the application of a coating of flux to the solder deposits on the ribbon members;

Fig. 7 is a schematic illustration of the feeding of a part between the bent ends of the ribbon members, the freeing of the ribbon members by the holders for movement and the heating of the ribbon portions and the solder deposits while moved to join the ribbon members to the part;

Fig. 8 is a schematic illustration of one of two adjacent steps of washing the part mounted on the ribbon members;

Fig. 9 is a schematic illustration of two adjacent steps of etching the part supported by the ribbon members;

Fig. 10 is similar to Fig. 8, and represents two steps of washing the etching fluid from the part;

Fig. 11 is a schematic illustration of the drying of the part;

Fig. 12 is a schematic illustration of the loading of a header in a chuck;

Fig. 13 is a schematic illustration of the trimming of the two main and the base leads of the header;

Fig. 14 is a schematic illustration of the mounting and forming of a conductive ribbon on the base lead;

Fig. 15 is a schematic illustration of a joining step of two groups of method steps to assemble and to secure in assembly the sub-assemblies of each article;

Fig. 16 is a schematic illustration of the trimming of the ribbon members to remove excess portions thereof, and Fig. 17 is a schematic illustration of the unloading of the finished article from its chuck.

In the present instance, the two groups of method steps are performed in the manner made possible by the apparatus shown in Fig. 1. This apparatus has two machines 20 and 21, having turrets 22 and 23, respectively, movable intermittently about their axes in timed relation with each other. The turret 22 has pairs of radially-positioned holders 24 located successively in the processing stations, identified by the circular formation of numbers from 1 to 16 inclusive. Stationary supports 25 are mounted beneath and beyond the turret 22 to support various processing units. At processing station 1, a unit 31 is operable to feed lengths of conductive material such as a metallic ribbon to the pair of holders 24 in the first station simultaneously with the feeding of the ribbons to the holders 24, quantities of flux are deposited on the ribbon. A processing unit 32 at station 2 deposits quantities of solder on the deposits of flux on the ribbon in that station. At station 3, a processing unit 33 is operable to cut a center portion from each ribbon. At station 4, a processing unit 34 is operable to bend the inner ends of the ribbon members into positions parallel with each other. At stations 5 a processing unit 35 is operable to coat the solder deposits with flux. At station 6, a processing unit 36 is operable to locate a part, such as a transistor crystal bar between the bent ends of the ribbon members, and to secure them in place. At stations 7 and 8 like units 37 and 38 are operated to wash the part or crystal bar to remove foreign particles therefrom. At stations 9 and 10 like units 39 and 40 are operable to etch the part or crystal bar held by the ribbon members. At stations 11 and 12, units 41 and 42 are operable to wash the remaining etching solution from the part or bar. At stations 13 and 14 a double unit 44 is operable to direct jets of air to dry the parts or bars. At station 15, a unit 45 is operable to join a sub-assembly formed by the machine 20 with a sub-assembly formed by the machine 21.

The turret 23 of the machine 21 has radially positioned chucks 47 movable successively into stations identified by letters A, B, C, D, E, F, G and H. At station A a unit 48, shown in detail in Patent No. 2,913,130, is operated to locate headers 49 singly in the successive chucks 47 as illustrated in Fig. 12. The headers 49 have two main leads 50 and a base lead 51 partially embedded in a dielectric material 52 and extend outwardly parallel with each other in the positions shown in Figs. 12 to 15 inclusive. At station B a unit 54 is operated to move cutters 55 and 56 relative to each other and the leads 50 and 51 to trim the leads to predetermined lengths. At station C, a unit 58, shown in detail in Patent No. 2,951,144, is operated to feed a metallic ribbon 59, Fig. 14, longitudinally to cause its leading portion to rest upon the base lead 51 where it is welded to the base lead by welding electrodes 60 and 61. The ribbon 59 is cut to length by cutters 62 and 63 while being held by a foot-like pressure member 64. The cutter 62 cooperates with a forming member 65 to bend the cut end of the welded ribbon.

All of the chucks 47 are movable radially and connected to piston rods 67 of air cylinders 68 which normally hold the chucks in the position shown until they reach the assembly position F in alignment with station 15 of the machine 20, at which time the chucks will move outwardly to move the sub-assembly, formed by the machine 21, in assembly with the sub-assembly formed by the machine 20, as illustrated in Fig. 15. The method steps taken in stations F–15 are common to both groups. Here the main leads 50 of the sub-assembly of the machine 21 are moved beneath the ribbon members of the sub-assembly of the machine 20 where they are joined by welding. The welding is brought about by unit 45 which is shown in detail in Patent No. 2,951,932. In unit 45 lower electrodes 70 engage the leads 50 and upper electrodes 71 engage the ribbon members. Completion of electrical welding currents through the pairs of electrodes 70—71 will weld the sub-assemblies, formed in machines 20 and 21, together. At station G of the machine 21, a processing unit 73 including upper cutters 74 and lower cutters 75, Fig. 16, operate to trim excess lengths from the ribbon members. At station H a unit 76 as shown in Fig. 13, in Patent No. 2,913,130, is operated to remove the completed article from the chuck 47, in that station, and deposit it on a rail 78 where it may travel away from the machine.

Returning to Figs. 2 to 11 inclusive, in each of these figures the holders 24 are in the form of grippers, the lower portions being fixed to the turret 22 while the upper portions are normally urged downwardly to grip ribbons 80 fed thereto. Suitable means, not shown, is operated to open the holders at different stations, first at station 1 to receive the ribbon (Fig. 2), then at station 6 to free the ribbon members for movement (Fig. 7) during mounting of the bar thereon, and at station 15 after completion of the assembly of the two sub-assemblies (Fig. 15). The holder opening means are shown in co-pending applications identified with stations 1 and 6 of machine 20 and the assembly station F–15.

In actual practice, see the co-pending applications of S. Kuba, Serial No. 750,806, filed July 24, 1958, and W. C. Gothe-J. O. Hinkle, Serial No. 750,064, filed July 11, 1958, the unit 31 has means to advance a ribbon longitudinally where a length cut therefrom is held by feeding jaws 81 and 82 to be fed thereby the holders 24 at station 1. The upper jaw 82, in the present instance, carries hollow dispensers 83 for liquid flux to deposit quantities of flux 84 at predetermined spaced positions upon each side of the longitudinal center of the ribbon 80.

Fig. 3 schematically illustrates the function of unit 32, shown more in detail in the Patent No. 2,951,146. This unit is for depositing quantities of solder 85 on the ribbon 80 where the quantities of flux were deposited. To melt the quantities of solder 85, a portion of the ribbon is included temporarily in an electrical circuit, shown schematically at 86, through contacts 87 to melt the solder deposits. The flux and solder deposits are greatly exaggerated in size for the purpose of illustration only. Fig. 4 schematically illustrates the functions of the unit 33 which has cutting tools 88 and 89 co-operating to cut the ribbon in two at its longitudinal center to divide the ribbon equally into two members. Fig. 5 illustrates schematically the function of the unit 34 which has tools 90 and 91 to form substantially right angle bends in the inner portions of the ribbon members 80 to locate the solder deposits 85 in alignment with each other. Fig. 6 illustrates the function of the unit 35 shown in detail in the co-pending application of S. Kuba-R.C. Shafer, Serial No. 745,560, filed June 30, 1958. This unit has a brush 92 operable to wipe a liquid flux on the solder deposits 85 on the parallel portions of the ribbon members 80.

Fig. 7 illustrates schematically what takes place in apparatus shown in the co-pending application of S. Kuba-R. C. Shafer, Serial No. 750,674, filed July 24, 1958. Here the action at station 6 includes the holding of a part 95 in jaws 96 and the feeding of the part between, but spaced from the solder deposits 85 on the parallel portions of the ribbon portions 80.

In the present instance, the part 95 is a transistor crystal bar which is produced from a grown crystal formation of germanium. This grown structure, produced from a germanium seed, includes what may be defined as large end portions of negative conductive material joined by a thin positive conductivity layer. This structure is cut into slices of predetermined thicknesses and the slices are cut to produce crystal bars, represented by part 95, having large or thick negative conductivity layers 97 joined by a positive conductivity layer 98. The bars 95 at this station were cut to an initial size but are unfinished. They are to be finished in this method and apparatus.

Returning to Fig. 7, the action, subsequent to locating a bar 95 by the jaws 96 between the bent parallel portions of the ribbon members 80 in alignment with the solder deposits, requires the function of heaters 99 to move into engagement with the ribbon members to heat particularly the parallel portions thereof. Heating of the parallel ribbon portions takes place during the lateral motion, indicated by the arrows, after the holders 24 are opened, as indicated by the dotted lines, to jointly melt the solder deposits and force the ribbon portions into close engagement with the end faces to the bar to secure the ribbon members thereto. The heating units are connected in parallel in a heating circuit represented by a secondary winding 100 of a transformer 101.

The next two steps of the method at stations 7 and 8 of machine 20 include washing actions performed by like units 37 and 38 to force one or more sprays 103 of a cleaning solution on the bar 95 to clean all foreign matter therefrom. As previously stated, the bar 95 is unfinished. The various cutting operations, to produce the bar from the slice and the slice from the grown crystal formation, disturbed the materials of the layers 97 and 98 adjacent the outer surfaces of the bar so that the bar would not function efficiently. Therefore, to complete the bar so that the electrical characteristics of the bar will be as nearly perfect as possible, the disturbed surface portions, particularly adjacent the joining areas of the layers 97 and 98, are removed by etching. The etching operations are performed by units 39 and 40, where suitable solutions 105 are directed to the areas of the bar to be etched. A circuit 106 including the nozzles 107 for the solutions 105, represent the electrolytic etchings of the bar. At stations 11 and 12, a suitable washing liquid, such as de-ironized water 108, is sprayed on the bars by one or more nozzles 109 at each station to wash the etching solution 105 which may have remained on the bar from station 10. Fig. 11 illustrates the action of unit 44 for stations 13 and 14, where at each station one or more nozzles 110 direct air under pressure to the bar to dry the bar thoroughly before it reaches station 15. The driving or operating means for the units of the apparatus is shown partially at the extreme left of Fig. 1, and is shown completely in the co-pending application of S. Kuba-R. C. Shafer Serial No. 746,426, filed July 3, 1958.

*Operation*

Through the operation of the apparatus, the different holders 24 and 47 receive parts which eventually result in sub-assemblies of an article. The article in the present instance is an electrical unit known as a transistor. With the two machines, forming the apparatus, driven in synchronism with each other, the steps in a method may be carried out. Each machine or portion of the apparatus permits the carrying out of groups of steps to form subassemblies which may be joined at an assembly station common to both machines or portions of the apparatus. Upon considering the method steps from one starting point, station 1 of machine 20, a ribbon 80 is fed to holders 24 by jaws 81 and 82, Fig. 2, simultaneously therewith a second step of depositing quantities of flux 84 by dispensers 83 on the ribbon, takes place. At station 2, quantities of solder 85 are placed on the flux deposits on the ribbon and at the same time a portion of the ribbon supporting the deposits is heated electrically to melt the solder deposits. The next successive steps are carried out at stations 3, 4 and 5 where, as illustrated in Figs. 4, 5 and 6 respectively, the ribbon is divided into two portions by cutting a central portion therefrom, the inner ends of the ribbon portions are bent at right angles to position the solder deposits in alignment with each other and the solder deposits are coated with a flux.

The next group of method steps take place at station 6, as illustrated in Fig. 7. Here the part or bar 95 is moved between the parallel portions of the ribbon members, with its end surfaces aligned with the solder deposits but spaced therefrom. The ribbon members are free, at this time by opening the holders 24, for movement toward the bar. The next steps include heating the parallel portions of the ribbon members to melt the solder deposits and applying forces to the parallel portions to move the ribbon members in close engagement with the end surfaces of the bar to join the ribbon members thereto by the melted solder.

As previously described, the bar 95, initially and through the steps illustrated in Figs. 2 to 7 inclusive, is unfinished. The finishing steps for the bar are carried out at stations 7 to 14 inclusive and illustrated in Figs. 8 to 11 inclusive. The first of the finishing steps, at stations 7 and 8, is the washing, Fig. 8, of foreign particles by a suitable cleansing solution. At stations 9 and 10 the bar is etched electrolytically, 106, by suitable etching solution 105. At stations 11 and 12 the etching solution remaining on the bar is washed free of the bar, Fig. 10, and at stations 13 and 14, steps are taken (Fig. 11) to dry the bar. This completes the forming of one sub-assembly. While this group of method steps are carried out, the method steps illustrated in Figs. 12, 13 and 14, are carried out so that the two sub-assemblies for the two portions of the apparatus may be joined into one structure or article at station F-15, Fig. 15, which is common to both portions of the apparatus.

There are finishing steps for the article at stations G and H, Figs. 16 and 17 where excess lengths of the ribbon members are cut therefrom and the article is removed from its holder 47 and placed on a track 78.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The method of fabricating an electrical subassembly comprising gripping a length of metallic ribbon at end portions thereof, depositing flux at locations on the ribbon intermediate the end portions, depositing solder on the flux, cutting the ribbon between the locations of flux and solder into two members, bending the members to position the locations of solder and flux on the ribbon members in facing alignment with each other, locating a transistor crystal bar between the locations of solder and flux on the ribbon members, releasing the members from the gripping force, moving the ribbon members toward the ends of the transistor crystal bar to engage the ends of the transistor crystal bar with the ribbon members, and heating the members to solder connect the members to the transistor crystal bar.

2. The method of fabricating an electrical assembly by attaching leads to the subassembly of claim 1 which comprises gripping the subassembly by the ribbon members, attaching end leads of a support to the ribbon members, and trimming excess lengths from the ribbon members beyond their connections from the leads.

References Cited in the file of this patent

UNITED STATES PATENTS

| | | |
|---|---|---|
| 1,983,808 | Poole | Dec. 11, 1934 |
| 2,666,977 | Pfann | Jan. 26, 1954 |
| 2,697,269 | Fuller | Dec. 21, 1954 |
| 2,699,594 | Bowne | Jan. 18, 1955 |
| 2,744,308 | Loman | May 8, 1956 |
| 2,754,784 | Maysmor et al. | July 17, 1956 |
| 2,829,423 | Long | Apr. 8, 1958 |
| 2,847,623 | Thornhill | Aug. 12, 1958 |
| 2,858,598 | Power et al. | Nov. 4, 1958 |
| 2,865,082 | Gates | Dec. 23, 1958 |
| 2,867,899 | Jacobs | Jan. 13, 1959 |
| 2,897,587 | Schnable | Aug. 4, 1959 |